(12) United States Patent
Weidmann et al.

(10) Patent No.: US 12,378,159 B2
(45) Date of Patent: Aug. 5, 2025

(54) BRANCHED COPOLYMERS AS DISPERSANTS FOR MINERAL BINDERS

(71) Applicant: SIKA TECHNOLOGY AG, Baar (CH)

(72) Inventors: Jürg Weidmann, Winterthur (CH); Jörg Zimmermann, Winterthur (CH); Lukas Frunz, Dietlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 233 days.

(21) Appl. No.: 17/766,276

(22) PCT Filed: Nov. 25, 2020

(86) PCT No.: PCT/EP2020/083326
§ 371 (c)(1),
(2) Date: Apr. 4, 2022

(87) PCT Pub. No.: WO2021/105188
PCT Pub. Date: Jun. 3, 2021

(65) Prior Publication Data
US 2024/0059612 A1    Feb. 22, 2024

(30) Foreign Application Priority Data
Nov. 29, 2019   (EP) .................................... 19212571

(51) Int. Cl.
*C04B 24/26*   (2006.01)
*C04B 103/40*   (2006.01)

(52) U.S. Cl.
CPC .... *C04B 24/2647* (2013.01); *C04B 2103/408* (2013.01)

(58) Field of Classification Search
CPC ............ C04B 24/2647; C04B 2103/408
See application file for complete search history.

(56) References Cited

FOREIGN PATENT DOCUMENTS

| | | |
|---|---|---|
| CN | 102993432 A | 3/2013 |
| CN | 105542147 A | 5/2016 |
| EP | 0116978 A2 | 8/1984 |
| EP | 0753488 A2 | 1/1997 |
| EP | 1103570 A2 | 5/2001 |
| EP | 1138697 A1 | 10/2001 |
| EP | 1179517 A2 | 2/2002 |
| EP | 1707542 A2 | 10/2006 |
| JP | 2014-065665 A | 4/2014 |
| JP | 2014-065760 A | 4/2014 |
| WO | 2007/076941 A1 | 7/2007 |
| WO | 2011/006838 A2 | 1/2011 |
| WO | 2014/059674 A1 | 4/2014 |
| WO | 2014/135318 A1 | 9/2014 |

OTHER PUBLICATIONS

Feb. 18, 2021 Written Opinion issued in International Patent Application No. PCT/EP2020/083326.
May 17, 2022 International Preliminary Report on Patentability issued in International Patent Application No. PCT/EP2020/083326.

*Primary Examiner* — John E Uselding
(74) *Attorney, Agent, or Firm* — Oliff PLC

(57) ABSTRACT

The invention relates to the use of branched copolymers as dispersants of mineral binders, wherein the copolymers are formed from
(1) at least one olefinically unsaturated carboxylic acid monomer
(2) at least one olefinically unsaturated macromonomer of the general structure (I)

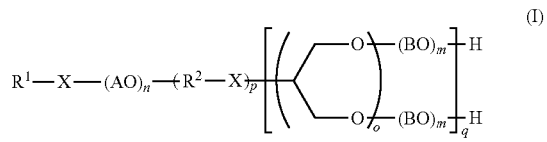

where $R^1$ is an olefinically unsaturated radical which has 2-10 carbon atoms and may optionally be substituted by oxygen and/or nitrogen, preferably vinyl, allyl, methallyl, vinyloxybutyl, isoprenyl, acryloyl and/or methacryloyl,
X=O or NH,
A is in each case independently C1-C10 alkylene, preferably ethylene, propylene and/or butylene,
$R^2$=C1-C16 alkyl,
B is in each case independently C1-C10 alkylene, preferably ethylene, propylene and/or butylene,
m is in each case independently an integer in the range of 0-350, preferably 2-200, more preferably 5-150, especially 7-30,
n is an integer in the range of 0-100, preferably 1-100, more preferably 2-75, most preferably 5-55,
p is 0 or 1, preferably 0,
o is an integer in the range of 1-50, preferably 3-40, more preferably 6-30, especially 8-20, and
q is an integer in the range of 1-10.

16 Claims, No Drawings

BRANCHED COPOLYMERS AS DISPERSANTS FOR MINERAL BINDERS

TECHNICAL FIELD

The invention relates to the use of branched copolymers as dispersants of mineral binders. A further aspect of the invention relates to a mineral binder composition and to a cured shaped body comprising the branched copolymer.

BACKGROUND

Dispersants or flow agents are used in the building industry as plasticizers or water-reducing agents for mineral binders and/or mineral binder compositions, for example concrete, mortar, cements, gypsums and lime. Dispersants used are generally organic polymers that are added to the mixing water or mixed into the binder or binder composition in solid form. In this way, it is advantageously possible to alter both the consistency of the binder composition during processing and the properties in the hardened state. The choice and dosage of a suitable dispersant depends especially on the specific composition, the processing methodology or the end use of the binder or binder composition.

In practice, high-performance plasticizers in the form of polycarboxylate ethers (PCEs) are frequently used as dispersants for mineral binders, for example in order to improve the flow characteristics of mineral binder compositions. Although conventional PCEs normally show a significant reduction in water level and reduce the yield point of mineral binder compositions, they have only a minor effect, if any, on viscosity.

EP 2 454 296 describes copolymers formed from branched macromonomers. Likewise described is the use of such copolymers as thickeners, for example in washing and cleaning compositions.

EP 2 964 586 describes copolymers as dispersants for mineral binders, wherein the copolymers contain units derived from (i) an olefinically unsaturated acid and (ii) an olefinically unsaturated branched polyether macromonomer having an alkyl terminus. These dispersants have the disadvantage that they are produced using epichlorohydrin, which is difficult to handle. Moreover, these polymers often lead to unwanted additional input of air.

There is thus still a need for improved dispersants for mineral binders that can overcome the disadvantages of the known prior art.

SUMMARY OF THE INVENTION

It is an object of the present invention to provide a process that enables efficient dispersion of mineral binders and hence improvement in the viscosity and/or flow characteristics of mineral binder compositions, especially without additional input of air.

It has been found that, surprisingly, this object can be achieved by the use of copolymers as dispersants for mineral binders, where the copolymers are formed from (1) at least one olefinically unsaturated carboxylic acid monomer (2) at least one olefinically unsaturated macromonomer of the general structure (I)

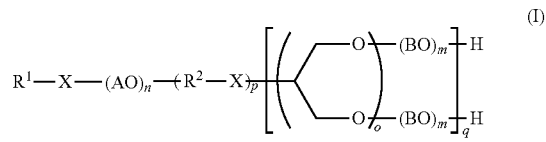

where $R^1$ is an olefinically unsaturated radical which has 2-10 carbon atoms and may optionally be substituted by oxygen and/or nitrogen, preferably vinyl, allyl, methallyl, vinyloxybutyl, isoprenyl, acryloyl and/or methacryloyl, X=O or NH, A is in each case independently C1-C10 alkylene, preferably ethylene, propylene and/or butylene, $R^2$=C1-C16 alkyl, B is in each case independently C1-C10 alkylene, preferably ethylene, propylene and/or butylene, m is in each case independently an integer in the range of 0-350, preferably 2-200, more preferably 5-150, especially 7-30, n is an integer in the range of 0-100, preferably 1-100, more preferably 2-75, most preferably 5-55, p is 0 or 1, preferably 0, o is an integer in the range of 1-50, preferably 3-40, more preferably 6-30, especially 8-20, and q is an integer in the range of 1-10.

A significant advantage of copolymers of the invention is the presence of a multitude of alkylene oxide-based side chains within a single macromonomer unit. This multitude is achieved by the introduction of branches. As a result, a single macromonomer unit has a much greater steric demand than macromonomer units having purely linear side chains as occur, for example, in conventional PCEs. This leads to reduced interaction with side chains of other macromonomer units. In this way, a copolymer of the invention may be used simultaneously as dispersant for mineral binders and for lowering the viscosity of mineral binder compositions, which constitutes a significant advantage.

Further advantages of the use of copolymers of the invention as dispersants in mineral binder compositions are less demixing or separation of the constituents of the mineral binder composition, and less unwanted input of air.

Finally, macromonomers required for formation of copolymers of the invention are notable for a simple synthesis that preferably does not require the use of epichlorohydrin. This is advantageous since epichlorohydrin is problematic on account of its toxicity and carcinogenicity.

Further aspects of the invention are the subject of other independent claims. Particularly preferred embodiments of the invention are the subject of the dependent claims.

Ways of Executing the Invention

The term "dispersant" in the present context is understood to mean an agent for improving the miscibility of mineral binders with a solvent, especially with water. A particular effect of dispersants in the context of the present invention is that mixtures of mineral binders or binder compositions with water have greater flowability and/or lower demixing than the same mixtures without the dispersant. Specifically, the flowability of mixtures of mineral binders or binder compositions with water is increased by addition of a dispersant. One particular measure of flowability is spread measured according to standard DIN EN 12350-5. Alternatively, a dispersant results in a reduction in the water demand of a mineral binder for establishment of the same flowability as a mixture of the mineral binder with water but without addition of dispersant. The copolymers of the invention act as dispersants and improve the flowability of a mineral binder composition modified therewith. The copolymers of the invention additionally also reduce the viscosity of a mineral binder composition modified therewith. One particular measure of viscosity is funnel flow time measured according to standard DIN EN 12350-9.

A first aspect of the invention relates to the use of copolymers as dispersants for mineral binders, wherein the copolymers are formed from
(1) at least one olefinically unsaturated carboxylic acid monomer
(2) at least one olefinically unsaturated macromonomer of the general structure (I)

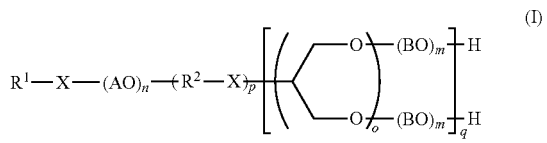
(I)

where $R^1$ is an olefinically unsaturated radical which has 2-10 carbon atoms and may optionally be substituted by oxygen and/or nitrogen, preferably vinyl, allyl, methallyl, vinyloxybutyl, isoprenyl, acryloyl and/or methacryloyl,
X=O or NH,
A is in each case independently C1-C10 alkylene, preferably ethylene, propylene and/or butylene,
$R^2$=C1-C16 alkyl,
B is in each case independently C1-C10 alkylene, preferably ethylene, propylene and/or butylene,
m is in each case independently an integer in the range of 0-350, preferably 2-200, more preferably 5-150, especially 7-30,
n is an integer in the range of 0-100, preferably 1-100, more preferably 2-75, most preferably 5-55,
p is 0 or 1. preferably 0,
o is an integer in the range of 1-50, preferably 3-40, more preferably 6-30, especially 8-20, and
q is an integer in the range of 1-10.

When q=1, o is an integer in the range of 1-50. When q>1, each o is independently an integer in the range of 1-50.

It is particularly preferable that p=0 when n>0.

The number of linear structural units $(BO)_m$ in the general structure (I) is dependent on o and q. The number of structural units $(BO)_m$ is equal to o×q+1.

Shown hereinafter for better elucidation are some example structures derived from the general structure (I) with defined combinations of o and q. These example structures shall in no way be considered to be limiting in respect of the macromonomers of the invention.

If o=2 and q=1, this results in macromonomers of the following general structure (Ia)

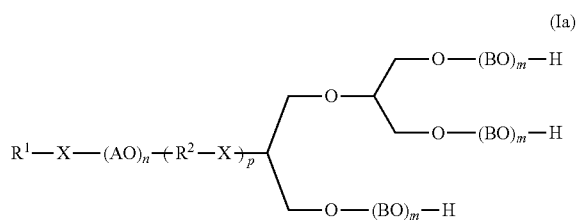
(Ia)

If o=3 and q=1, this results in macromonomers of the following general structure (Ib)

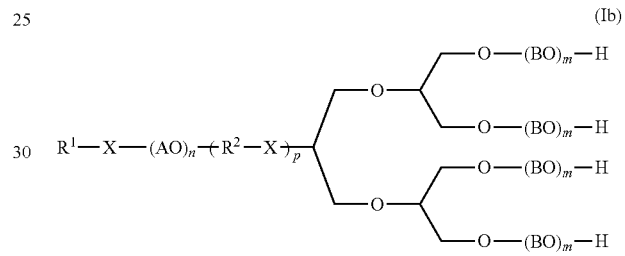
(Ib)

If o=1 and q=2, this results in macromonomers of the following general structure (Ic)

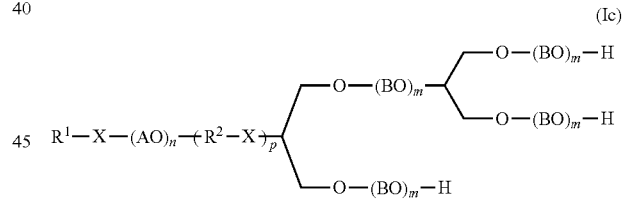
(Ic)

If o=2 and q=3, this results in macromonomers of the following general structure (Id)

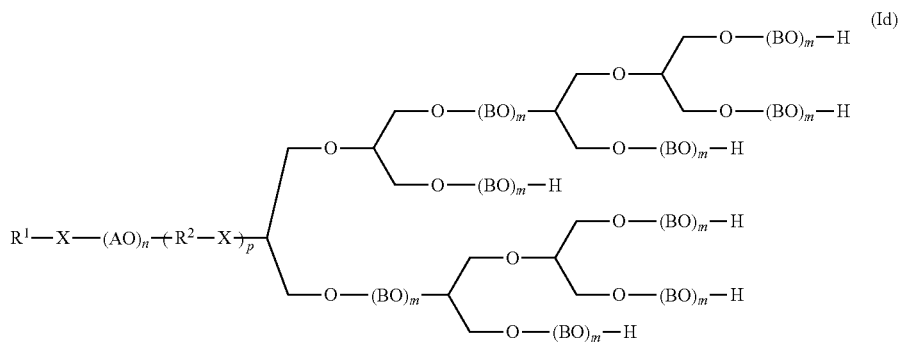
(Id)

It will be dear to the person skilled in the art that the macromonomers of the invention may contain different regioisomers. These are regioisomers that form when, in the preparation of the macromonomers using glycidol, for example, the oxirane ring of the glycidol is opened via the various carbon atoms according to one of the chemical reaction equations a) and b) as shown below.

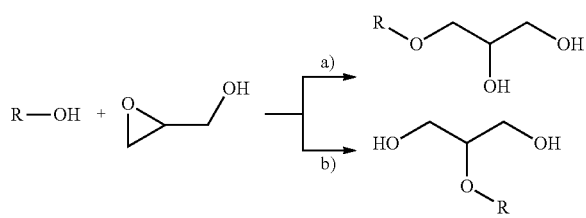

By way of simplification, in the present invention, only regioisomer b) is ever depicted. However, what are meant are always both regioisomers a) and b) or mixtures thereof.

The structural elements (AO) and (BO) of the general structure (I) are polyalkylene oxide chains. Preferably, a proportion of ethylene oxide units in the polyalkylene oxide chains $(AO)_m$ and $(BO)_m$, based on all alkylene oxide units AO and BO present, is more than 90 mol %, especially more than 95 mol %, preferably more than 98 mol %, especially 100 mol %. In a particular embodiment, the polyalkylene oxide side chains do not have any hydrophobic groups, especially any alkylene oxides having three or more carbon atoms. A high proportion of ethylene oxide units or a low content of alkylene oxides having three or more carbon atoms reduces the risk of unwanted input of air.

Weight-average molecular weight ($M_W$) in the present context is determined by gel permeation chromatography (GPC) with polyethylene glycol (PEG) as standard. This technique is known per se to the person skilled in the art. Copolymers of the invention may have a molar mass $M_w$ in the range of 250-1,000,000 g/mol. In preferred copolymers, the parameters n, m, o and p in the general structure (I) are chosen such that the average molar mass $M_w$ of the copolymers is in the range of 1,000-1,000,000, more preferably 1,500-500,000, even more preferably 2,000-100,000, especially 3,000-75,000 or 3,000-50,000.

The expression "mineral binder" in the present context is understood to mean a binder which reacts in the presence of water in a hydration reaction to give solid hydrates or hydrate phases. This may, for example, be a hydraulic binder (e.g. cement or hydraulic lime), a latently hydraulic binder (e.g. slag), a pozzolanic binder (e.g. fly ash) or a nonhydraulic binder (gypsum or white lime).

A "mineral binder composition" is correspondingly a composition comprising at least one mineral binder.

More particularly, the mineral binder comprises a hydraulic binder, preferably cement. Particular preference is given to a cement having a cement clinker content of ≥35% by weight. More particularly, the cement is a portland cement or portland composite cement of the CEM I, CEM II, CEM III, CEM IV or CEM V type according to standard EN 197-1, or an aluminate cement, especially an alumina cement according to DIN EN 14647, or mixtures of the cements mentioned.

The mineral binder composition comprises at least one hydraulic binder, preferably cement, at at least 5% by weight, preferably at at least 20% by weight, more preferably at at least 35% by weight, even more preferably at at least 65% by weight, especially ≥95% by weight, based in each case on the dry mass of the mineral binder composition.

Alternatively, it may also be advantageous when the mineral binder or the mineral binder composition comprises or consists essentially of other binders. These are especially latently hydraulic binders and/or pozzolanic binders. Suitable latently hydraulic and/or pozzolanic binders are, for example, slag, fly ash, silica dust, microsilica, metakaolin, tuff, tress, volcanic ash, zeolites and/or burnt oil shale.

In a further embodiment, the mineral binder may comprise or consist essentially of α-calcium sulfate hemihydrate, β-calcium sulfate hemihydrate, anhydrite and/or lime.

The mineral binder composition may likewise comprise inert substances, for example limestone, quartz flours and/or pigments.

In an advantageous embodiment, the mineral binder contains 5-95% by weight, especially 5-65% by weight, more preferably 15-35% by weight, based in each case on the total dry mass of the mineral binder, of latently hydraulic and/or pozzolanic binders. Advantageous latently hydraulic and/or pozzolanic binders are, for example, slag and/or fly ash.

In a particularly preferred embodiment, the mineral binder comprises a hydraulic binder, especially cement or cement clinker, and a latently hydraulic and/or pozzolanic binder, preferably slag and/or fly ash. The proportion of the latently hydraulic and/or pozzolanic binder here is more preferably 5-65% by weight, more preferably 15-35% by weight, while at least 35% by weight, especially at least 65% by weight, based in each case on the dry mass of the mineral binder.

In preferred embodiments, the mineral binder is accordingly selected from the group comprising cement, especially portland cement and aluminate cement, α-calcium sulfate hemihydrate, β-calcium sulfate hemihydrate, anhydrite, lime, industrial and synthetic slags, especially blast furnace slags, foundry sand, foundry sand flour, electrothermal phosphorus slags, copper slags and stainless steel slags, pozzolans, especially fly ashes, microsilica, metakaolin, natural pozzolans, especially tuff, trass and volcanic ash, natural and synthetic zeolites, burnt oil shale and mixtures thereof.

The at least one olefinically unsaturated carboxylic acid monomer for formation of copolymers of the present invention may be a monocarboxylic acid, dicarboxylic acid or carboxylic anhydride monomer. Monocarboxylic acid monomers are particularly preferred. It is possible to use different olefinically unsaturated carboxylic acid monomers for formation of copolymers. Structural units of the copolymer that are derived from unsaturated carboxylic acid monomers may independently be in their protonated form or in wholly or partly neutralized form, for example by bases such as alkali metal or alkaline earth metal bases, ammonia, organic amines, etc.

The at least one olefinically unsaturated carboxylic acid monomer for formation of copolymers of the present invention may be selected from structures of the general structures (IIa) and/or (IIb)

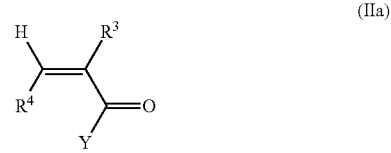

where $R^3$=H or a C1-C6-alkyl chain, $R^4$=H, C(O)Y, or a C1-C6-alkyl chain, preferably H, and Y=OM, with M selected from H, alkali metals, alkaline earth metals or organic ammonium, or Y=$NR^4R^5$ with $R^4$ and $R^5$ independently being H or a C1-C6-alkyl chain;

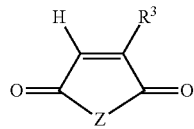

(IIb)

where Z=O or $NR^5$, and $R^3$ has the definitions above, and $R^5$=H or a C1-C6-alkyl chain.

Particularly preferred unsaturated carboxylic acid monomers are acrylic acid and salts thereof, acrylamides, methacrylic acid and salts thereof, methacrylamides, maleic acid and salts thereof, maleic anhydride, maleimides, crotonic acid and salts thereof, fumaric acid and salts thereof, and mixtures thereof.

The at least one olefinically unsaturated macromonomer of the general structure (I) is a branched polyether macromonomer. It is possible to use multiple chemically and/or structurally different macromonomers of the general structure (I) for formation of copolymers of the invention. "Structurally different" here especially also includes macromonomers of the general structure (I) that differ, for example, solely in terms of their molar mass, for example as a result of different choice of parameters m, o and/or q.

Particular preference is given to olefinically unsaturated macromonomers of the general structure (I) in which $R^1$ is a vinyl, allyl, methallyl, vinyloxybutyl, isoprenyl, acryloyl or methacryloyl unit.

In a preferred embodiment, inventive olefinically unsaturated macromonomers of the general structure (I) are those macromonomers in which p=0 if n>0 and in which p=1 if n=0. In this embodiment, in each macromonomer, there is thus either a $(AO)_m$ unit or a $R^2$—X unit.

In a further preferred embodiment, all m are chosen such that the average number of (BO) units in each of the o×q+1 linear structures is the same.

In accordance with a preferred embodiment, inventive olefinically unsaturated macromonomers of the general structure (I) are those macromonomers in which $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl,

X=O,

A is in each case independently C1-C10 alkylene, preferably ethylene,

B is in each case independently C1-C10 alkylene, preferably ethylene, m is in each case independently an integer in the range of 5-150, n is an integer in the range of 5-55, p=0, o is an integer in the range of 8-50, and q is an integer in the range of 1-10, especially 1.

Such monomers conform to the general structure (III)

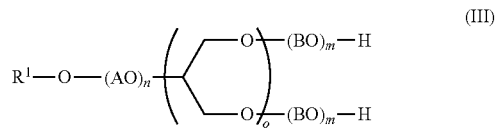

(III)

In accordance with a further preferred embodiment, inventive olefinically unsaturated macromonomers of the general structure (I) are those macromonomers in which $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl,

X=O,

A is in each case independently ethylene, propylene and/or butylene, more preferably ethylene, B is in each case independently ethylene, propylene and/or butylene, more preferably ethylene, m is in each case independently an integer in the range of 0-350, more preferably 2-200, even more preferably 5-150, especially 7-30, n is an integer in the range of 1-100, more preferably 2-75, most preferably 5-55, p=0, and o is an integer in the range of 1-50, more preferably 3-40, even more preferably 6-30, especially 8-20, and q is at least 2.

Such macromonomers conform to the general structure (IV)

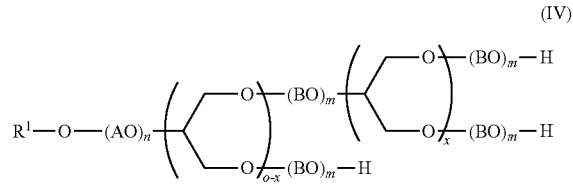

(IV)

where x is an integer of 1-9, with the proviso that x<o.

In accordance with a further preferred embodiment, inventive olefinically unsaturated macromonomers of the general structure (I) are those macromonomers in which $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl,

X=O,

B is in each case independently ethylene, propylene and/or butylene, more preferably ethylene, $R^2$ is C1-C16 alkyl, more preferably C2-C4 alkyl, especially butyl, m is in each case independently an integer in the range of 0-350, more preferably 2-200, even more preferably 5-150, especially 7-30, n=0, o is an integer in the range of 1-50, more preferably 3-40, even more preferably 6-30, especially 8-20, and q is at least 2.

Such macromonomers conform to the general structure (V)

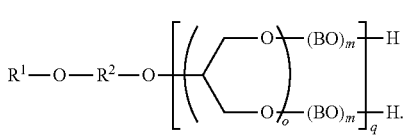

In accordance with a further preferred embodiment, inventive olefinically unsaturated macromonomers of the general structure (I) are those macromonomers in which
$R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl,
X=O,
B is in each case independently ethylene, propylene and/or butylene, more preferably ethylene,
m is in each case independently an integer in the range of 0-350, more preferably 2-200, even more preferably 5-150, especially 7-30,
n=0,
p=0,
q is an integer in the range of 1-10, and
o is in each case independently an integer in the range of 1-50, more preferably 3-40, even more preferably 6-30, especially 8-20.

Such macromonomers conform to the general structure (VI)

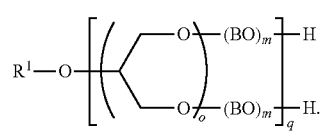

The molar ratio of the at least one olefinically unsaturated carboxylic acid monomer to the at least one olefinically unsaturated macromonomer of the general structure (I) is in the range of 0.3-30, preferably 0.6-10, more preferably 1-4.5, especially 1-3.

In addition to the at least one olefinically unsaturated carboxylic acid monomer and the at least one olefinically unsaturated macromonomer of the general structure (I), copolymers of the invention may contain one or more further monomers M. These further monomers M may be selected from styrene, ethylene, propylene, butylene, butadiene, isoprene, vinyl acetate, vinyl chloride, acrylonitrile, N-vinylpyrrolidone, hydroxyalkyl (meth)acrylates and/or macromonomers of the general structures (VII)

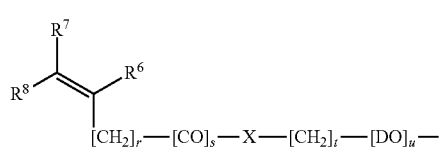

where
$R^6$ is in each case independently H, —$CH_2$—COOM or an alkyl group having 1 to 5 carbon atoms, preferably H or —$CH_3$, $R^7$ is in each case independently H or an alkyl group having 1 to 5 carbon atoms, preferably H,
$R^8$ is in each case independently H, —COOM or an alkyl group having 1 to 5 carbon atoms, preferably H,
r=0, 1 or 2,
s=0 or 1,
t=0, or an integer from 1 to 4,
u=2-250, especially 10-200,
X is in each case independently —O— or —NH—,
$R^9$ is in each case independently H, a C1- to C20-alkyl group, cyclohexyl group or alkylaryl group, and
D is a C2- to C4-alkylene group, preferably ethylene.

In a very particularly preferred embodiment, the additional monomers M are selected from linear polyethylene glycol ethers, especially polyethylene glycol ethers of vinyl alcohol, allyl alcohol, methallyl alcohol, vinyloxybutyl alcohol and/or isoprenol, and/or linear polyethylene glycol esters, especially polyethylene glycol esters of acrylic acid and/or methacrylic acid.

It is preferable that the molar proportion of the one or more further monomers M is not more than 66 mol %, preferably not more than 50 mol %, more preferably not more than 25 mol %, especially preferably not more than 10 mol %, in particular not more than 5 mol %, based in each case on all monomers that form the copolymer.

Olefinically unsaturated macromonomer of the general structure (I) can be prepared in a multistage process comprising the steps of
1) optionally reacting a starter S, selected from the group consisting of alcohols, amines, carboxylic acids or carboxamides of the general formula $R^1$—XH, with an alkoxylating agent and/or a halogenated alcohol or halogenated amine Hal-$R^2$—XH, where $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl, X=O or NH, Hal=Cl, Br or I, and $R^2$=C1-C16 alkyl,
2) reacting a starter S or the reaction product from step 1) with glycidol or epichlorohydrin or a mixture of glycidol and an alkoxylating agent or a mixture of epichlorohydrin and an alkoxylating agent,
3) optionally reacting the reaction product from step 2) with an alkoxylating agent.

Preference is given to conducting the individual steps of the process successively, without isolation or purification of the intermediates.

The reaction conditions in steps 1) to 3) may vary. For example, the reaction temperature, pressure and/or the type and amount of catalyst used in steps 1) to 3) may be different. In general, however, it is preferable when the reaction temperature, pressure and the type and amount of catalyst used in steps 1) to 3) are the same.

The reaction temperature may vary within the range between 80° C.-180° C., especially 100° C.-140° C. The pressure is preferably in the range of 1-5 bar, especially in the range of 1-3 bar.

The individual steps of the process are preferably conducted under catalysis. Suitable catalysts for the alkoxylations of steps 1) to 3) are known per se to the person skilled in the art. In preferred embodiments, reaction steps 1) to 3) are catalyzed. It is especially preferable to utilize the same catalyst for steps 1) to 3) without intermediate removal or deactivation thereof. Particularly suitable catalysts have been found to be alkali metal hydroxides and/or alkali metal alkoxides. In a preferred embodiment, the catalyst used is an alkali metal alkoxide of that alcohol which is also used as starter S. It may also be preferable to use sodium alkoxides, specifically sodium methoxide or sodium ethoxide, as catalyst.

A suitable process for preparing macromonomers of the invention is specified, for example, in EP 0 116 978.

The starter S in the present context is a compound selected from the group consisting of alcohols, amines, carboxylic acids or carboxamides of the general formula $R^1$—XH where $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl, and X=O or NH. It is particularly preferable that the starter S, apart from the XH group, does not contain any further nucleophilic groups. When the starter S is an alcohol, it is a monool, i.e. an alcohol having just one OH group. When the starter S is an amine, it is a primary amine, i.e. an amine having an $NH_2$ group. The starter S is not a secondary or tertiary amine.

In particularly preferred embodiments, the starter S is selected from the group consisting of isoprenol, vinyl alcohol, allyl alcohol, methallyl alcohol, vinyloxybutyl alcohol, acrylic acid, methacrylic acid, acrylamide or methacrylamide.

Alkoxylating agents in the context of the present invention are compounds that can be converted by polymerization to polyethers. Alkoxylating agents thus bring about alkoxylation, i.e. the formation of alkylene oxide or polyalkylene oxide units. In particular, alkoxylating agents in the context of the present invention contain oxirane, oxetane or oxolane structures. Particularly preferred alkoxylating agents are alkylene oxides selected from ethylene oxide, propylene oxide and/or 1,2-butylene oxide, and/or tetrahydrofuran. Specifically, the alkoxylating agent is ethylene oxide and/or propylene oxide. It may be preferable to use just one alkoxylating agent in one of steps 1) to 3). In a very preferred embodiment, just one alkoxylating agent, especially ethylene oxide, is used in steps 1) to 3). Alternatively, it is also possible to use two or more alkoxylating agents in steps 1) to 3), either as a mixture or each individually in any one of steps 1) to 3).

In a preferred embodiment, macromonomers of the invention are prepared without the use of epichlorohydrin. The process for preparation is thus epichlorohydrin-free.

Macromonomers of the invention may accordingly preferably be prepared in a process comprising the steps of:
1) optionally reacting a starter S, selected from the group consisting of alcohols, amines, carboxylic acids or amides of the general formula $R^1$—XH, with an alkoxylating agent and/or a halogenated alcohol or halogenated amine Hal-$R^2$—XH, where $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl, X=O or NH, Hal=Cl, Br or I, and $R^2$=C1-C16 alkyl,
2) reacting a starter S or the reaction product from step 1) with glycidol or a mixture of glycidol and an alkoxylating agent,
3) optionally reacting the reaction product from step 2) with an alkoxylating agent.

It is especially preferable here when the process comprises steps 1) and 3), meaning that steps 1) and 3) are not optional but necessarily present.

In a particularly preferred embodiment, macromonomers of the invention are prepared without the use of epichlorohydrin and using an alcohol as starter S. The process for preparation is thus epichlorohydrin-free. Macromonomers of the invention may accordingly more preferably be prepared in a process comprising the steps of:
1) optionally reacting an alcohol $R^1$—OH with an alkoxylating agent and/or a halogenated alcohol or halogenated amine Hal-$R^2$—XH, where $R^1$ is an olefinically unsaturated radical which has 2-10 carbon atoms and may optionally be substituted by oxygen, preferably vinyl, allyl, methallyl, vinyloxybutyl or isoprenyl, X=O or NH, Hal=Cl, Br or I, and $R^2$=C1-C16 alkyl,
2) reacting an alcohol $R^1$—OH or the reaction product from step 1) with glycidol or a mixture of glycidol and an alkoxylating agent,
3) optionally reacting the reaction product from step 2) with an alkoxylating agent.

It is especially preferable here when the process comprises steps 1) and 3), meaning that steps 1) and 3) are not optional but necessarily present.

In a further particularly preferred embodiment, macromonomers of the invention are prepared without the use of epichlorohydrin and using an amine as starter S. The process for preparation is thus epichlorohydrin-free. Copolymers of the invention may accordingly also more preferably be prepared in a process comprising the steps of:
1) optionally reacting an amine $R^1$—$NH_2$ with an alkoxylating agent and/or a halogenated alcohol or halogenated amine Hal-$R_2$—XH, where $R^1$ is an olefinically unsaturated radical which has 2-10 carbon atoms and may optionally be substituted by oxygen, preferably vinyl, allyl, methallyl, vinyloxybutyl or isoprenyl, X=O or NH, Hal=Cl, Br or I, and $R^2$=C1-C16 alkyl,
2) reacting an amine $R^1$—$NH_2$ or the reaction product from step 1) with glycidol or a mixture of glycidol and an alkoxylating agent,
3) optionally reacting the reaction product from step 2) with an alkoxylating agent.

It is especially preferable here when the process comprises step 3), meaning that step 3) is not optional but necessarily present.

In a further particularly preferred embodiment, macromonomers of the invention are prepared without the use of epichlorohydrin and using a carboxylic acid as starter S. The process for preparation is thus epichlorohydrin-free. Copolymers of the invention may accordingly also more preferably be prepared in a process comprising the steps of:
1) optionally reacting a carboxylic acid $R^1$—OH with an alkoxylating agent and/or a halogenated alcohol or halogenated amine Hal-$R^2$—XH, where $R^1$ is an olefinically unsaturated radical which has 2-10 carbon atoms and may optionally be substituted by oxygen, preferably acryloyl and/or methacryloyl, X=O or NH, Hal=Cl, Br or I, and $R^2$=C1-C16 alkyl,
2) reacting a carboxylic acid $R^1$—OH or the reaction product from step 1) with glycidol or a mixture of glycidol and an alkoxylating agent,
3) optionally reacting the reaction product from step 2) with an alkoxylating agent.

It is especially preferable here when the process comprises steps 1) and 3), meaning that steps 1) and 3) are not optional but necessarily present.

In a very particularly preferred embodiment, macromonomers of the invention are prepared without the use of epichlorohydrin and using an alcohol as starter S, where the starter alcohol is first reacted with an alkoxylating agent. The process for preparation is thus epichlorohydrin-free. Macromonomers of the invention may accordingly even more preferably be prepared in a process comprising the steps of:

1) reacting an alcohol $R^1$—OH with an alkoxylating agent, where $R^1$ is an olefinically unsaturated radical which has 2-10 carbon atoms and may optionally be substituted by oxygen, preferably vinyl, allyl, methallyl, vinyloxybutyl or isoprenyl,
2) reacting the reaction product from step 1) with glycidol or a mixture of glycidol and an alkoxylating agent,
3) optionally reacting the reaction product from step 2) with an alkoxylating agent.

It is especially preferable here when the process comprises step 3), meaning that step 3) is not optional but necessarily present.

Copolymers of the invention may be random or nonrandom copolymers. Nonrandom copolymers are especially alternating copolymers or block or gradient copolymers.

Copolymers of the invention that are random copolymers can be prepared by free-radical polymerizations of mixtures comprising at least one olefinically unsaturated carboxylic acid monomer and at least one olefinically unsaturated monomer of the general structure (I) as described above. Suitable conditions for performance of free-radical polymerizations are known per se to the person skilled in the art and are described, for example, in EP 1 103 570 (Nippon Shokubai).

Copolymers of the invention that are nonrandom copolymers, especially block or gradient copolymers, may preferably be prepared by living free-radical polymerization. The techniques of living free-radical polymerization include nitroxide-mediated polymerization (NMP), atom transfer radical polymerization (ATRP) or reversible addition-fragmentation chain transfer polymerization (RAFT). Living free-radical polymerization proceeds essentially in the absence of irreversible transfer or termination reactions. The number of active chain ends is low and remains essentially constant during the polymerization. This is achieved, for example, in the case of RAFT polymerization by the use of a RAFT agent and only a small amount of initiator. This enables essentially simultaneous growth of the chains that continues over the entire polymerization process. This results in the option of using this process to prepare block or gradient copolymers, resulting in a correspondingly narrow molecular weight distribution or polydispersity of the polymer. This is not possible in the case of conventional "free-radical polymerization" or of free-radical polymerization conducted in a non-living manner. It is particularly advantageous to prepare nonrandom copolymers of the present invention by means of RAFT polymerization. Advantageous RAFT agents are dithioesters, dithiocarbamate, trithiocarbonate or xanthate.

Advantageous initiators are azobisisobutyronitrile (AIBN), α,α'-azodiisobutyramidine dihydrochloride (AAPH) or azobisisobutyramidlne (AIBA).

In a particularly preferred embodiment, the preparation of copolymers of the invention by free-radical polymerization or by living free-radical polymerization directly follows the preparation of the at least one olefinically unsaturated macromonomer of the general structure (I). A further aspect of the present invention therefore relates to a multistage process for preparing a copolymer for use as dispersant of mineral binders. A particularly preferred process for preparing copolymers of the invention therefore comprises the steps of:
1) optionally reacting a starter S, selected from the group consisting of alcohols, amines, carboxylic acids or amides of the general formula $R^1$—XH, with an alkoxylating agent and/or a halogenated alcohol or halogenated amine Hal-$R^2$—XH, where $R^1$ is an olefinically unsaturated radical which has 2-10 carbon atoms and may optionally be substituted by oxygen, preferably vinyl, allyl, methallyl, vinyloxybutyl, isoprenyl, acryloyl and/or methacryloyl, X=O or NH, Hal=Cl, Br or I, and $R^2$=C1-C16 alkyl,
2) reacting a starter S or the reaction product from step 1) with glycidol or epichlorohydrin or a mixture of glycidol and an alkoxylating agent or a mixture of epichlorohydrin and an alkoxylating agent,
3) optionally reacting the reaction product from step 2) with an alkoxylating agent, and
4) free-radically polymerizing a mixture of at least one olefinically unsaturated carboxylic acid monomer with the reaction product from step 3) or, if this is not part of the process, with the reaction product from step 2).

It is especially preferable here when the process comprises steps 1) and 3), meaning that steps 1) and 3) are not optional but necessarily present.

More preferably, the process does not include any steps for workup and/or purification of intermediates. However, catalysts and/or neutralization reagents which are used in steps 1) to 3) and which can hinder the free-radical polymerization must be removed or depleted by reaction. More particularly, these may be those catalysts and/or neutralization reagents that interact with activators, initiators and/or regulators, such as chain transfer agents or RAFT agents, of the free-radical polymerizations.

In accordance with a particularly preferred embodiment, the free-radical polymerization is conducted as a solution polymerization, especially in a solvent containing water. It is very particularly preferable to conduct the polymerization in pure water.

It is preferable to run the free-radical polymerization for preparation of copolymers of the invention up to a conversion of at least 75%, preferably at least 80%, more preferably at least 90%, even more preferably at least 95%, especially at least 98% or more, based in each case on the total molar amount of monomers present.

Copolymers of the invention may be in liquid form, for example in the form of a solution or dispersion, especially in the form of an aqueous solution. It is preferable when copolymers of the invention have a proportion of a solution or dispersion, especially an aqueous solution, of at least 30% by weight, preferably at least 40% by weight, more preferably at least 50% by weight, based in each case on the total weight of the solution or dispersion.

It is likewise possible to convert copolymers of the invention to a solid form, preferably a powder form. Suitable methods are, for example, application to a solid carrier and/or drying of a solution or dispersion containing copolymers of the invention. An example of a suitable method of drying is spray drying. A multistage process for preparing a copolymer of the invention may therefore contain a drying step, especially spray drying of the copolymer. Pulverulent copolymers of the invention may be added to a mineral binder or a mineral binder composition, for example for production of a dry mortar mixture.

The use of copolymers of the invention in mineral binders or mineral binder compositions is for the purpose of improving the flow characteristics thereof and/or the viscosity thereof. This means that a mineral binder composition containing at least one copolymer of the invention flows better, i.e. has higher spread according to DIN EN 12350-5, than this mineral binder composition without copolymer of the invention. This means simultaneously that the use of a copolymer of the invention in a mineral binder composition reduces the amount of water required to establish a particular spread than in the case of a corresponding composition without copolymer of the invention. Moreover, the use of a copolymer of the invention in a mineral binder composition leads to a reduction in viscosity, measured as a reduction in funnel flow time by standard DIN EN 12350-9, compared to a corresponding composition without copolymer of the invention. Both properties are equally important for achievement of optimal processing properties of mineral binder compositions.

Furthermore, the use of a copolymer of the invention in a mineral binder composition leads to particularly low input of air. Input of air is measured according to standard DIN EN 12350-7. This is important especially for the attainment of a high final strength. In addition, this property also has the effect that copolymers of the invention can be combined with standard air pore formers without affecting the efficacy thereof. The input of a desired amount of air and hence a particular air pore distribution is thus ensured in a simple manner without having to match the type and amount of the air pore former to the dispersant.

A further aspect of the present invention is therefore a mineral binder or mineral binder composition comprising at least one mineral binder, preferably cement, and at least one copolymer of the invention.

The mineral binders and copolymers of the invention are as described above. It is possible and indeed preferred in some cases that mixtures of two or more copolymers of the invention that differ chemically and/or structurally are used.

The mineral binder composition is preferably a mortar or concrete composition.

The mineral binder composition may be made up with water and/or contain water. The ratio of water to mineral binder is in the range of 0.18-0.7, preferably 0.2-0.6, more preferably 0.25-0.5, most preferably 0.3-0.45. In very particularly preferred embodiments, the mineral binder is a cement, in which case the ratio of water to mineral binder corresponds to the w/c ratio.

The copolymer of the invention is present in a mineral binder or mineral binder composition advantageously with a proportion of 0.01-10% by weight, preferably 0.05-7% by weight, more preferably 0.1-5% by weight, even more preferably 0.2-3% by weight, especially 0.2-1% by weight, based in each case on the content of mineral binder.

It is possible to add a copolymer of the invention as such, for example in powder form, to a mineral binder composition. It is alternatively also possible to add a copolymer of the invention as an aqueous solution or dispersion in water to a mineral binder composition. It is further possible to dissolve or disperse a copolymer of the invention in an additive, especially an aqueous additive.

A further aspect of the present invention is therefore an additive comprising at least one copolymer of the invention. In addition, the additive may contain further standard additives for mineral binder compositions. Such standard additives are advantageously selected from the list consisting of plasticizers, air pore formers, defoamers, accelerators, retardants, shrinkage reducers, activators, sealants, stabilizers, thickeners, chromate reducers, corrosion inhibitors, hydrophobizing agents, pigments, fibers and biocides.

In a particular embodiment, at least one copolymer of the invention is used in an additive together with one or more conventional plasticizers based on polycarboxylate ethers (PCEs). Suitable PCEs are described, for example, in EP0753488, EP1138697, EP1179517 and EP1966258. It is possible to mix the at least one copolymer of the invention with one or more plasticizers based on PCE to give a component, and to add this to a mineral binder composition. It is alternatively also possible to in each case separately add the at least one copolymer of the invention and one or more plasticizers based on PCE to a mineral binder composition.

A last aspect of the present invention is a shaped body obtainable by curing a mineral binder or a mineral binder composition comprising at least one copolymer of the invention. The shaped body may, for example, be a concrete part, for example a precast concrete part or a concrete Nock, a cured mortar mixture, for example joint mortar or a screed, and/or part of a built structure, for example of a bridge or tunnel.

The invention is elucidated in detail hereinafter by examples. However, the examples serve merely for illustration and should not be regarded as a restriction of the scope of the invention.

EXAMPLES

Synthesis Example 1

Preparation of the Macromonomer M-1

Step 1: In a reactor inertized with $N_2$ gas, 4 g (0.074 mol) of sodium methoxide is dissolved in 464 g (8 mol) of allyl alcohol and heated to 100° C. This is followed by metered addition of 1760 g (40 mol) of ethylene oxide over the course of 5 hours. In the course of this, the temperature is kept at 100 to 140° C. and the pressure at 1 to 3 bar. After the metered addition has ended, the reaction mixture is stirred at 140° C. for 2 hours. Subsequently, the mixture is cooled to 30° C.

Step 2: In a reactor inertized with $N_2$ gas, 0.54 g (0.01 mol) of sodium methoxide is added to 117 g (0.42 mol) of the mixture from step 1) and heated to 130° C. This is followed by metered addition of 93 g (1.26 mol) of glycidol over the course of 30 minutes. In the course of this, the temperature is kept at 130 to 140° C. and the pressure at 1 to 3 bar. After the metered addition has ended, the reaction mixture is stirred at 140° C. for 2 hours. The mixture is left to cool to 50° C.

Step 3: After cooling to 50° C., 2.2 g (0.04 mol) of sodium methoxide is added to the mixture from step 2). The reactor is inertized again with $N_2$ gas and heated to 130° C. This is followed by metered addition of 628 g (14.27 mol) of ethylene oxide over the course of 4 hours. In the course of this, the temperature is kept at 130 to 140° C. and the pressure at 0 to 3 bar. After the metered addition has ended, the reaction mixture is stirred at 140° C. for 3 hours. Subsequently, the mixture is cooled to 50° C. and neutralized with 3.2 g (0.054 mol) of acetic acid. The resultant mixture is the macromonomer M-1.

Synthesis Example 2

Preparation of the Copolymer C-1

A reactor inertized with $N_2$ gas is initially charged with 70 g of water, 57 g (0.05 mol) of macromonomer M-1, 27 g (0.05 mol) of an allyl alcohol-started polyethylene glycol (11 EO units), 26 g (0.36 mol) of acrylic acid, 50 g of a 16% aqueous NaOH solution, 0.8 g of a 10% aqueous solution of Fe(II)$SO_4$·$7H_2O$ and 1.1 g of sodium hypophosphite. While stirring, 5.5 g of a 30% aqueous hydrogen peroxide solution and 2.3 g of a 5% aqueous Rongalit solution are added dropwise and simultaneously at a temperature of 20-35° C.

over the course of 70 min. 120 min after commencement of the addition, a clear solution of copolymer C-1 is obtained.

The following table gives an overview of the copolymers used:

TABLE 1

Copolymers used

| | |
|---|---|
| R-1 | Aqueous solution of a PCE (55% dry matter) formed from acrylic acid (3.6 mol) and ethoxylated methallyl alcohol (Mw = 2'400 g/mol; 1 mol) |
| C-1 | Copolymer from synthesis example 2 |

Use Example 1

Mortar Test

A dry mix was produced, consisting of 150 g of cement (CEM I 42.5 N from Vigier Holding AG), 5.8 g of microsilica (SikaFume®-HR/-TU, available from Sika Schweiz AG), 69.2 g of blast furnace slag (Regen GGBS from Hanson UK) and 41.5 g of limestone (Nekafill 15 from Kalkfabrik Netstal AG). For production of the dry mix, the constituents were dry mixed in a Hobart mixer for 30 seconds. Added to this dry mixture were the additives specified in table 2, each dissolved in 60 g of water. Mixing was continued at level 1 for 30 seconds, and finally at level 2 for 3.5 minutes.

The spread of the mortar obtained was measured to DIN EN 12350-5. In addition, the funnel flow time was measured to DIN EN 12350-9.

The air content was ascertained 30 minutes after makeup according to standard DIN EN 12350-7.

The following table gives an overview of the results:

TABLE 2

Results of the mortar tests

| Test | Additive* | Spread [mm] | Funnel flow time [s] | Air content [%] |
|---|---|---|---|---|
| V-1 | 3% R-1 | 165 | 215 | 1.6 |
| E-1 | 3% C-1 | 162 | 150 | 1.2 |
| E-2 | 3% C-1 1% LP | 162 | 142 | 4.4 |

*dosage in percent by weight relative to the dry weight of the cement
LP: Air pore former consisting of 1% by weight of aluminum powder (particle size D50 = 5 μm, screen residue at 45 μm of <0.1% by weight), 0.5% by weight of distilled tall oil, 98.5% by weight of calcium carbonate powder.

The invention claimed is:

1. A copolymer, the copolymer having repeating units formed from
   (1) at least one olefinically unsaturated carboxylic acid monomer, and
   (2) at least one olefinically unsaturated macromonomer of the general structure (I)

$$R^1—X—(AO)_n—(R^2—X)_p—\left[\begin{pmatrix} O—(BO)_m—H \\ O_o—(BO)_m—H \end{pmatrix}\right]_q \quad (I)$$

where
   $R^1$ is an olefinically unsaturated radical which has 2-10 carbon atoms and may optionally be substituted by oxygen and/or nitrogen,
   X is O or NH,
   A is in each case independently a C1-C10 alkylene,
   $R^2$ is a C1-C16 alkyl,
   B is in each case independently a C1-C10 alkylene,
   m is in each case independently an integer in the range of 2-200,
   n is an integer in the range of 0-100,
   p is 0 or 1,
   o is an integer in the range of 1-50, and
   q is an integer in the range of 2-10.

2. The copolymer as claimed in claim 1, wherein the at least one unsaturated carboxylic acid monomer is a monomer of the general structures (IIa) or (IIb)

$$\begin{matrix} H & R^3 \\ R^4 & \diagdown C=O \\ & Y \end{matrix} \quad (IIa)$$

where
   $R^3$ is a H or a C1-C6-alkyl chain,
   $R^4$ is a H, C(O)Y, or a C1-C6-alkyl chain, and
   Y is OM, with M selected from H, alkali metals, alkaline earth metals or organic ammonium, or Y is $NR^4R^5$ with $R^4$ and $R^5$ independently being H or a C1-C6-alkyl chain;

$$\begin{matrix} H & R^3 \\ O= & =O \\ & Z \end{matrix} \quad (IIb)$$

where Z is O or $NR^5$ and $R^3$ has the definitions as above, and $R^5$ is a H or a C1-C6-alkyl chain.

3. The copolymer as claimed in claim 1, wherein in the general structure (I),
   X is O,
   p is 0,
   m is in each case independently an integer in the range of 5-150,
   n is an integer in the range of 5-55, and
   o is an integer in the range of 8-50.

4. The copolymer as claimed in claim 1, wherein the proportion of ethylene oxide units in the polyalkylene oxide chains $(AO)_n$ and $(BO)_m$, based on all alkylene oxide units AO and BO present, is more than 90 mol %.

5. The copolymer as claimed in claim 1, wherein the molar ratio of the at least one olefinically unsaturated carboxylic acid monomer to the at least one olefinically unsaturated macromonomer of the general structure (I) is in the range of 0.3-30.

6. The copolymer as claimed in claim 1, wherein the copolymer further comprises at least one additional repeating unit formed from a monomer M selected from the group consisting of styrene, ethylene, propylene, butylene, butadiene, isoprene, vinyl acetate, vinyl chloride, acrylonitrile, N-vinylpyrrolidone, hydroxyalkyl (meth) acrylates and a monomer of the general structure (VI)

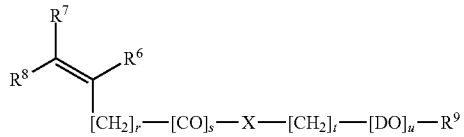

$$[CH_2]_r\text{—}[CO]_s\text{—}X\text{—}[CH_2]_t\text{—}[DO]_u\text{—}R^9 \quad (VI)$$

where
- $R^6$ is in each case independently H, —CH$_2$—COOM or an alkyl group having 1 to 5 carbon atoms,
- $R^7$ is in each case independently H or an alkyl group having 1 to 5 carbon atoms,
- $R^8$ is in each case independently H, —COOM or an alkyl group having 1 to 5 carbon atoms,
- r is 0, 1 or 2,
- s is 0 or 1,
- t is 0, or an integer from 1 to 4,
- u=2-250,
- X, in each case independently, is —O— or —NH—,
- $R^9$ is in each case independently H, a $C_1$ to $C_{20}$ alkyl group, cyclohexyl group or alkylaryl group, and
- D is a $C_2$ to $C_4$ alkylene.

7. A composition comprising:
  at least one mineral binder and at least one copolymer as claimed in claim 1, wherein
  the at least one copolymer is present in the composition in an amount effective to act as a dispersant for the at least one mineral binder, and
  an average molar mass Mw of the at least one copolymer is in the range of 1,000-1,000,000 g/mol.

8. The composition as claimed in claim 7, wherein the at least one mineral binder is selected from the group consisting of cement, portland cement, aluminate cement, α-calcium sulfate hemihydrate, β-calcium sulfate hemihydrate, anhydrite, lime, industrial slags, synthetic slags, blast furnace slags, foundry sand, foundry sand flour, electrothermal phosphorus slags, copper slags, stainless steel slags, pozzolans, fly ashes, microsilica, metakaolin, natural pozzolans, tuff, trass, volcanic ash, natural zeolites, synthetic zeolites, and burnt oil shale.

9. The composition as claimed in claim 7, wherein the at least one copolymer is present in an amount of 0.01-10% by weight based on the content of the at least one mineral binder.

10. A multistage process for preparing the copolymer as claimed in claim 1, comprising the steps of
  1) forming a first reaction product by reacting an alcohol or amine $R^1$—XH with alkylene oxide and/or a halogenated alcohol or amine Hal-$R^2$—XH, where $R^1$ is an olefinically unsaturated radical which has 2-10 carbon atoms and may optionally be substituted by oxygen and/or nitrogen, X is O or NH, Hal is a halide and $R^2$ is a $C_1$-$C_{16}$ alkyl,
  2) forming a second reaction product by reacting the first reaction product from step 1) with glycidol or epichlorohydrin or a mixture of glycidol and alkylene oxide or epichlorohydrin and alkylene oxide,
  3) forming a third reaction product by reacting the second reaction product from step 2) with alkylene oxide, and
  4) forming a fourth reaction product by free-radically polymerizing a mixture of at least one olefinically unsaturated carboxylic acid monomer with the third reaction product from step 3).

11. The multistage process as claimed in claim 10, further comprising
  5) drying the fourth reaction product from step 4).

12. A mineral binder or mineral binder composition comprising
  at least one mineral binder, and
  at least one copolymer obtained from the multistage process as claimed in claim 10.

13. The mineral binder or mineral binder composition as claimed in claim 12, comprising 0.01-10% by weight, based on the content of the at least one mineral binder, of the at least one copolymer obtained from a multistage process comprising the steps of
  1) forming a first reaction product by reacting an alcohol or amine $R^1$—XH with alkylene oxide and/or a halogenated alcohol or amine Hal-$R^2$—XH, where $R^1$ is an olefinically unsaturated radical which has 2-10 carbon atoms and may optionally be substituted by oxygen and/or nitrogen, X is O or NH, Hal is a halide and $R^2$ is a $C_1$-$C_{16}$ alkyl,
  2) forming a second reaction product by reacting the first reaction product from step 1) with glycidol or epichlorohydrin or a mixture of glycidol and alkylene oxide or epichlorohydrin and alkylene oxide,
  3) forming a third reaction product by reacting the second reaction product from step 2) with alkylene oxide, and
  4) free-radically polymerizing a mixture of at least one olefinically unsaturated carboxylic acid monomer with the third reaction product from step 3).

14. An additive for mineral binder compositions, comprising at least one copolymer obtained from the multistage process as claimed in claim 10.

15. The additive as claimed in claim 14, further comprising one or more polycarboxylate ethers.

16. A shaped body obtained by curing the mineral binder or the mineral binder composition as claimed in claim 12.

* * * * *